Oct. 16, 1934.  J. D. SPALDING  1,977,020

SELF ALIGNING STUFFING BOX AND BEARING

Original Filed March 1, 1932

Inventor
John D. Spalding
By Lyon & Lyon
Attorneys

Patented Oct. 16, 1934

1,977,020

UNITED STATES PATENT OFFICE 1,977,020

SELF-ALIGNING STUFFING BOX AND BEARING

John D. Spalding, Los Angeles, Calif., assignor, by mesne assignments, to The National Superior Company, Toledo, Ohio, a corporation of Delaware Original application March 1, 1932, Serial No. 596,069. Divided and this application July 24, 1933, Serial No. 681,899

3 Claims. (Cl. 188—264)

This application relates to self-aligning stuffing boxes and bearings, and more particularly to a stuffing box and bearing structure applicable for support of, and for the conduction of fluid into or from a passage formed in a rotating shaft. This application is a division of my copending application, Serial No. 596,069 filed March 1, 1932, for Water cooled brake rims for drawworks.

It is an object of this invention to provide an improved form of self-aligning stuffing box and bearing structure for a rotating shaft in which the gland structure is supported from the bearing structure in such a manner as to maintain the passages formed in the shaft and in the gland structure in axial alignment under operating conditions.

Another object of this invention is to provide a self-aligning stuffing box and bearing for a rotating shaft having a port through which fluid is adapted to be conducted, which bearing and stuffing box structure includes a bearing bracket in which there is mounted a self-aligning bearing member having a contour in the form of a segment of the sphere mounted so as to permit the bearing member to align itself with respect to the axis of the shaft and in which structure there is incorporated a stuffing box, the fluid conducting means of which is supported with relation to the bearing support in such a manner as to permit the port through the stuffing box to be mounted in alignment with the port or passage formed through the shaft.

Other objects and advantages of this invention it is believed will be apparent from the following detailed description of a preferred embodiment thereof as illustrated in the accompanying drawing.

Figure 1:
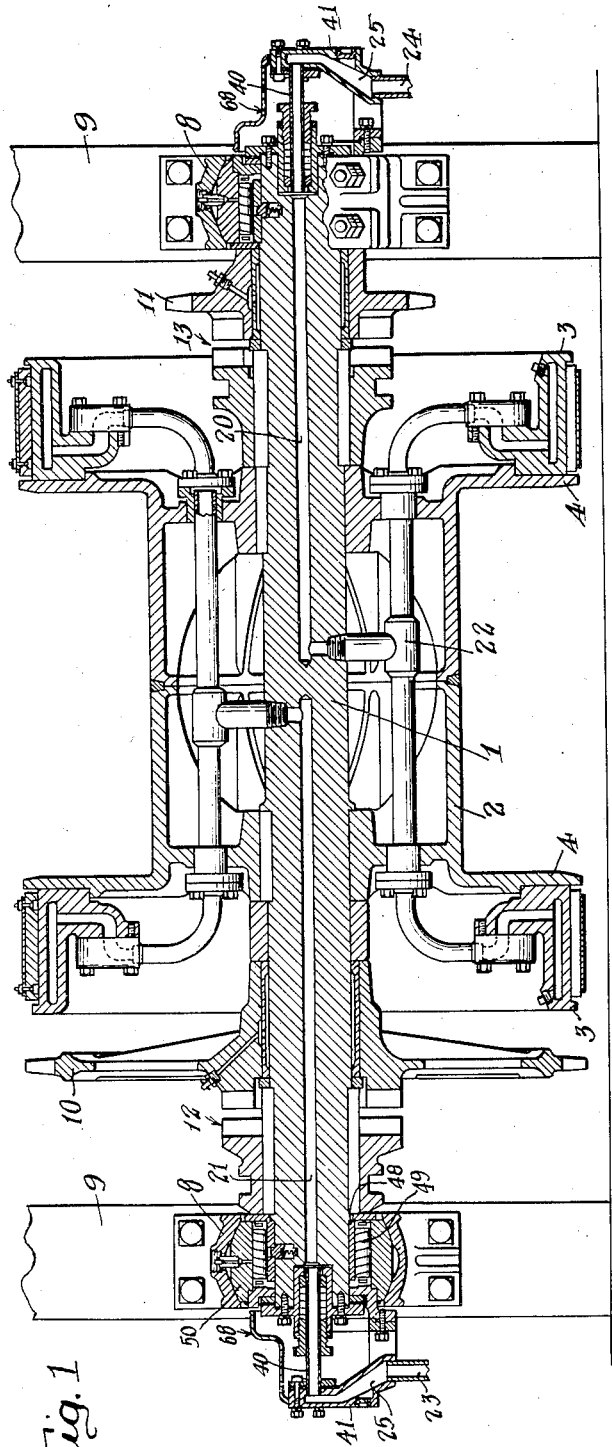
Figure 1 is a side elevation in vertical mid-section of a portion or fragment of the rotary drawworks drum and shaft illustrating the same as supported by the self-aligning stuffing box and bearing structure embodied in my invention.
Figure 3:
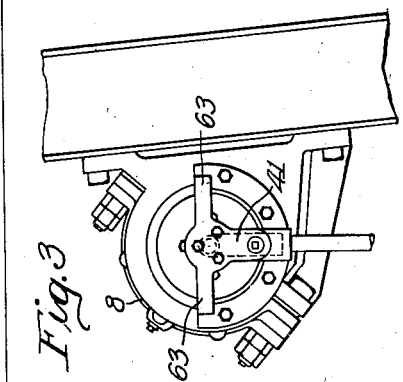
Figure 3 is an end elevation of the structure as illustrated in Figure 1.
Figure 2:
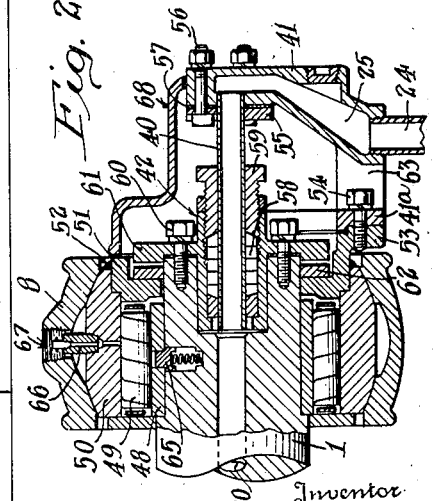
Figure 2 is a fragmental section on an enlarged scale of the self-aligning bearing box and bearing structure as illustrated in Figure 1.

In the preferred embodiment of my invention as illustrated in the accompanying drawing, 1 indicates a drum shaft on which a drum 2 is mounted. Brake rims 3 are secured to the drum flanges 4 by any suitable or desirable means. The shaft 1 is journaled in the bearings 8 which are supported by the posts 9. Means are provided for driving the shaft 1 at a plurality of speeds, which means may be of any suitable or desirable construction as is well understood in the art and is herein illustrated as including a pair of drive sprockets 10 and 11 which are commonly driven from sprocket chains of a line shaft (not shown) but common in drawworks construction.

The sprockets 10 and 11 are releasably engaged to the drum shaft 1 by means of clutches 12 and 13 when the drum is utilized for hoisting. The shaft 1 is journaled in self-aligning roller bearing units 8 which consists of an inner race 48, roller assembly 49, and an outer race 50.

The outer race 50 has its outer contour formed in the shape of a segment of a sphere which fits within the spherical opening in the bearing box to permit alignment of the bearing unit with the shaft. By this means the axis of the outer race 50 will always coincide with the axis of the shaft 1.

An annular plate 51 fits within a recess at the outer end of the race 50 and is preferably spot-welded to the race as indicated at 52. The plate 51 provides an enclosure for the roller assembly 49 and also a thrust face to fix the axial position of the drum shaft 1. The plate 51 is flanged at 53 for approximately one-half of its circumference to provide a connection for the bracket 41 which has a complementary semi-annular flange 41a. Bracket 41 is secured to the flange 53 by means of cap screws 54.

A sleeve 40 of the stuffing box is secured to the bracket 41 by extending into an opening formed therein and by means of a flange collar 55 which is welded to the sleeve 40. The flanged collar 55 is secured in position by means of bolts 56. A gasket 57 is provided for maintaining a water-tight joint at this connection.

The rotary packing gland 42 which surrounds the sleeve 40 is provided with suitable packing 58 which is compressed by means of a screw follower 59. The rotary packing gland 42 is secured to the shaft 1 by means of cap screws 60. The rotary packing gland 42 has an outwardly projecting flange 61 which projects beyond the periphery of the shaft 1 to form a thrust face to fix the axial alignment of the shaft 1 with respect to the stationary thrust face formed in the plate 51.

A replaceable thrust washer 62 is interposed between the plate 51 and the flange 61 to form a bearing. The outer portion of the bracket 41 is connected with the flange portion 41a by means of connecting arms 63. The shaft 1 is drilled to provide a pair of oppositely extending ports 20 and 21 which provide inlet and outlet passages for the conveying of cooling water to the interior of the brake rims 3 through the connections 22. The ports 20 and 21 communicate with the ports formed through the hollow sleeves 40. At one end of the shaft 1 the stuffing box is connected with an inlet pipe 23 and at the opposite end of the shaft 3 the stuffing box is connected with an outlet pipe 24. The inlet and outlet pipes 23 and 24 are secured to the ported brackets 41 to communicate with the hollow sleeves 40 through passages 25 formed through the brackets 41.

The inlet pipe 23 is connected to a source of water supply through a flexible hose connection (not shown) and the outlet pipe 24 is also connected through a flexible hose connection to a collecting sump or supply tank (not shown).

In order to hold the inner race 48 of the bearings stationary with respect to the shaft 1, spring pressed dowels 65 are provided in the shaft 1 to fit within openings formed in the inner races 48.

In order to provide means for lubricating the bearings 49, a grease fitting 66 is secured in position in the outer race 50 and access is had to the grease fitting 66 through an opening 67 normally formed in the bearing bracket 8.

The grease fitting 66 fits loosely within the opening 67 to prevent rotation of the outer race 50 and yet permits of a limited movement of the race which is incidental to its self-aligning function.

A detachable cover plate 68 fits over the upper portion of the bracket 41 to protect the operator against accidental contact with the revolving stuffing box 42.

Having fully described my invention, it is to be understood that I do not wish to be limited to the details herein set forth, but my invention is of the full scope of the appended claims.

I claim:

1. In a hoisting apparatus, the combination of a drum, a shaft supporting said drum, said shaft being journaled in self-aligning bearing assemblies at its ends, said bearing assemblies including a housing, a stationary element within said housing being free to align its axis with the axis of the shaft, a brake rim mounted on said shaft, a circulatory system within said hoisting apparatus, means provided at the opposite ends of said shaft for inlet and discharge connections, said means including a rotary packing gland within said shaft ends, a stationary bracket connected with the stationary element of each bearing assembly for supporting a sleeve in axial alignment with the said shaft and within said packing gland, means for supplying a coolant liquid through one bracket to said sleeve and said circulatory system, and means for conveying the coolant from said system through the bracket at the discharge end of the shaft.

2. A self-aligning stuffing box and bearing including a bracket having a spherical interior contour, a bearing assembly including an outer member having a complementarily curved surface mounted within the bearing bracket, a shaft supported within the bearing assembly, a stuffing box bracket secured to the bearing assembly and including a means for delivering fluid into a port formed in the shaft, and a stuffing box surrounding the latter said means and secured to the shaft for maintaining a fluid-tight connection between the shaft and the said fluid conducting means.

3. In combination with a self-aligning stuffing box and bearing, a supporting bracket having a spherical interior contour, a bearing assembly including a non-rotating or stationary member having a complementary spherically formed outer surface mounted within the supporting bracket, a shaft having a fluid conducting passage supported within the bearing assembly, a stuffing box secured to the end of said shaft, said stuffing box having an outwardly extending flange extending beyond the periphery of the shaft, a complementary inwardly extending flange on the stationary member of the bearing assembly, a renewable thrust bearing means between said flanges to axially position the shaft in said bearing assembly, an outwardly extending bracket supported by the non-rotating portion of said bearing assembly, a fluid conducting sleeve non-rotatively secured to said bracket and projecting into the stuffing box in communication with the passage in the shaft, packing means within said stuffing box to seal around the sleeve, and conduit means connecting with the passage in said sleeve to convey fluid to or away from the shaft.

JOHN D. SPALDING.